United States Patent [19]

Ida

[11] Patent Number: 5,247,457
[45] Date of Patent: Sep. 21, 1993

[54] TRAP SELECTOR
[75] Inventor: Masahiro Ida, Kakogawa, Japan
[73] Assignee: TLV Co., Ltd., Kakogawa, Japan
[21] Appl. No.: 608,542
[22] Filed: Nov. 2, 1990
[30] Foreign Application Priority Data Nov. 2, 1989 [JP] Japan .................. 1-286516

[51] Int. Cl.⁵ .............................. G06F 15/06
[52] U.S. Cl. ..................... 364/505; 364/512
[58] Field of Search ........... 364/505, 512, 472, 709.01, 364/709.02; 137/171, 185

[56] References Cited

U.S. PATENT DOCUMENTS

| | | | |
|---|---|---|---|
| 3,877,479 | 4/1975 | Miyawaki | 137/185 |
| 4,279,021 | 7/1981 | See et al. | 364/709.01 |
| 4,868,772 | 9/1989 | Collard | 364/709.01 |
| 4,896,273 | 1/1990 | Moore et al. | 364/505 |

OTHER PUBLICATIONS

European Search Report Application No. EP 90 12 1069.0 together with European Patent Application 0426 199 A3.
Zhu et al.; "A Symbolic Approach to the Fast Design of Industrial Piping System"; Proceedings of the SAE/ESD Int Computer Graphics Conf.; Apr. 7-9, 1987 pp. 69-73.

Primary Examiner—Jack B. Harvey
Assistant Examiner—Ellis B. Ramirez
Attorney, Agent, or Firm—Kane, Dalsimer, Sullivan, Kurucz, Levy, Eisele and Richard

[57] ABSTRACT

The present invention is a trap selector for selecting an optimum trap meeting various uses which is designed to sequentially input required data for selecting the trap and to execute previously memorized trap-selecting programs by a microcomputer characterized in that the geometrical conditions of various kinds of traps are previously memorized, the thermodynamical working conditions such as pressure thereof are inputted, when an optimum trap must be selected, so as to calculate the discharging flow rate (capacity), which is compared to the actually required discharging flow rate. In the conventional trap selector, all discharging characteristics for every pressure or temperature and the like of various kinds of traps must be memorized, but in the trap selector according to the present invention, the designated calculation is executed from the previously memorized geometrical conditions of various kinds of traps and the thermodynamical working conditions, which are inputted at the selection, such as pressure thereof and the obtained discharging flow rate is compared with actually required discharging flow rate and therefore the optimum trap can be decided.

10 Claims, 4 Drawing Sheets

TRAP SELECTOR

BACKGROUND OF THE INVENTION

1. Field of the Invention

The present invention relates to a trap selector which is used when, among various traps, an appropriate trap must be selected for automatically exhausting condensed water or condensate (drainage), which is produced in steam, compressed air, or at a gas piping system to which said trap is attached.

For example, a steam trap is naturally used as a self-actuated valve which automatically discharges only condensate without losing steam from the steam piping system or steam equipment. Such a steam trap is classified into a mechanical type, a thermostatic type, a thermodynamic type and the like according to its operation principle. There are steam trap types in which the condensate is continuously discharged and those in which it is intermittently discharged. The steam trap may be further classified into various types, such as a trap for low pressure or a trap for high pressure, and a trap with small capacity or a trap with large capacity.

Upon the selection of a steam trap, an optimum one has to be selected so as to meet various working conditions such as steam pressure, steam temperature, condensation rate, the class or the operating state of the device to which the trap in question is attached, or the presence of the condensate for recovery.

2. Description of the Prior Art

One of the conventional trap selectors is disclosed in the Japanese unexamined patent publication (Kokai) Heisei 1-207817 (1989). This trap selector is designed to select an optimum trap which has various uses in such a way that certain data required for the selection of a trap is sequentially inputted in accordance with the indication of a display and program which is previously memorized, the selection of a trap is executed by a microcomputer.

Although the optimum trap can be automatically selected only by inputting the required data into the conventional trap selector, it has a great inconvenience in that the memory inevitably has to be enormous. This problem is caused because one of the most fundamental conditions in the selection of a steam trap or a gas trap resides in selecting a trap provided with enough discharging capability to discharge actual condensate volume and, therefore, all discharging characteristics for every pressure or temperature and the like of various kinds of traps are memorized in the trap selector mentioned above. Thus, a memory with an extremely large capacity is needed. Depending on the temperature of the discharged condensate in the steam trap, degree of reevaporation in the condensate is varied and the discharging characteristic is also changed. As described above, since all the discharging characteristics must be memorized for respective types of conditions in the conventional trap selectors, memory capacity must be further increased. The increase of memory capacity unavoidably causes the cost of the trap selector itself to be raised.

SUMMARY OF THE INVENTION

Accordingly, it is a primary object of the present invention to provide a trap selector capable of selecting an optimum trap in spite of small memory capacity in which the above mentioned defects and disadvantages of the conventional trap selector can be substantially eliminated.

In accordance with the present invention, this object can be attained by the following technical improvement to a trap selector in which data required for selecting a trap is sequentially inputted, previously memorized trap selecting programs are executed by a microcomputer, and an optimum trap suitable for its purpose is selected. The above mentioned improvement resides in that the geometrical conditions of various kinds of traps are memorized beforehand, the thermodynamical working conditions such as pressure are inputted in case of selection, and that the respective discharging flow rates/capacities of these traps are calculated and then these discharging flow rates/capacities are compared with the actually required discharging flow rate so as to decide the optimum trap.

The function of the trap selector according to the present invention will be described in the following.

The geometrical conditions of a trap, that is, the diameter of an orifice, the figure of a passage and the like, are inherent in each trap and univocally determined. The discharging flow rates of the several traps are respectively calculated from the geometrical conditions and the thermodynamical working conditions such as pressure, which are different in accordance with working conditions. Accordingly, the discharging flow rates for the respective working conditions of the several traps had not previously been put into memory. The calculated discharging flow rates of the various kinds of traps are compared with the flow rate necessary for the actual use, as a result of which, an optimum trap capable of discharging the desired flow rate can be selected.

According to the present invention, since it is not necessary to memorize the discharging flow rates for the respective working conditions of the various traps, the memory capacity prior to the selection can be significantly reduced and the optimum trap can be selected based on the use of the small memory.

These objects and advantages of the present invention will become apparent upon reference to the following explanation, attendant claims and drawings.

DETAILED DESCRIPTION OF PREFERRED EMBODIMENT

An embodiment of the present invention showing a form of the aforementioned technical improvement will be explained hereafter.

Figure 1:
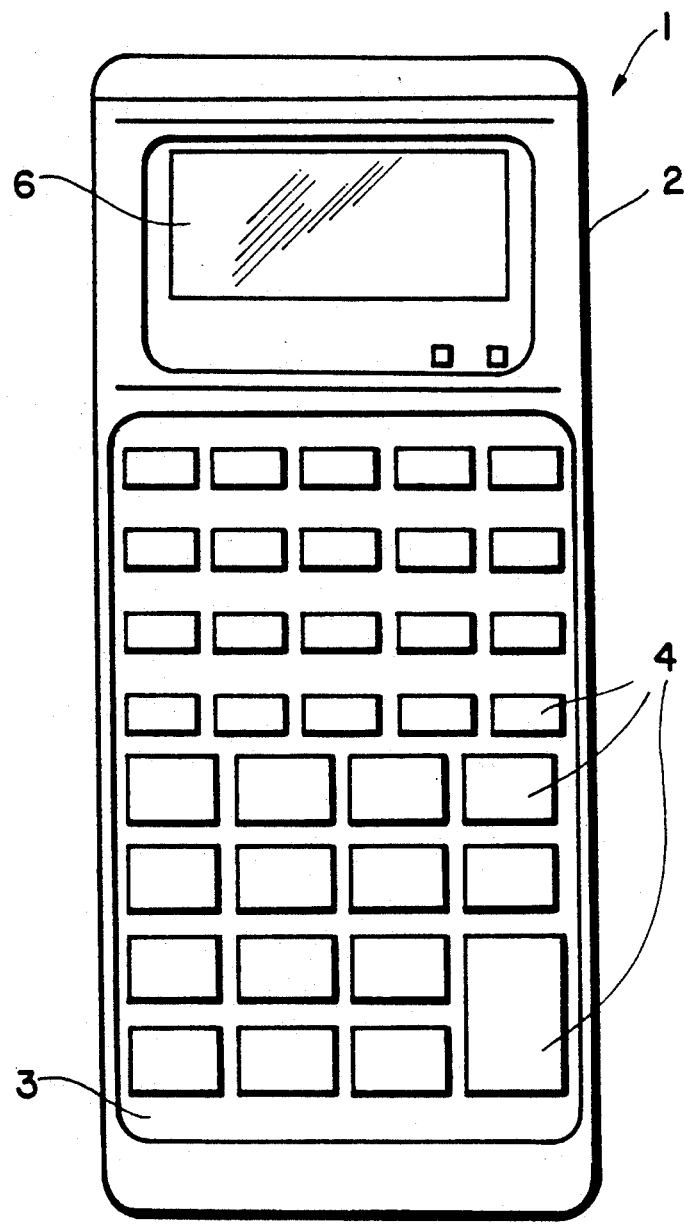
FIG. 1 is a general front view showing an embodiment of a trap selector according to the present invention.
Figure 2:
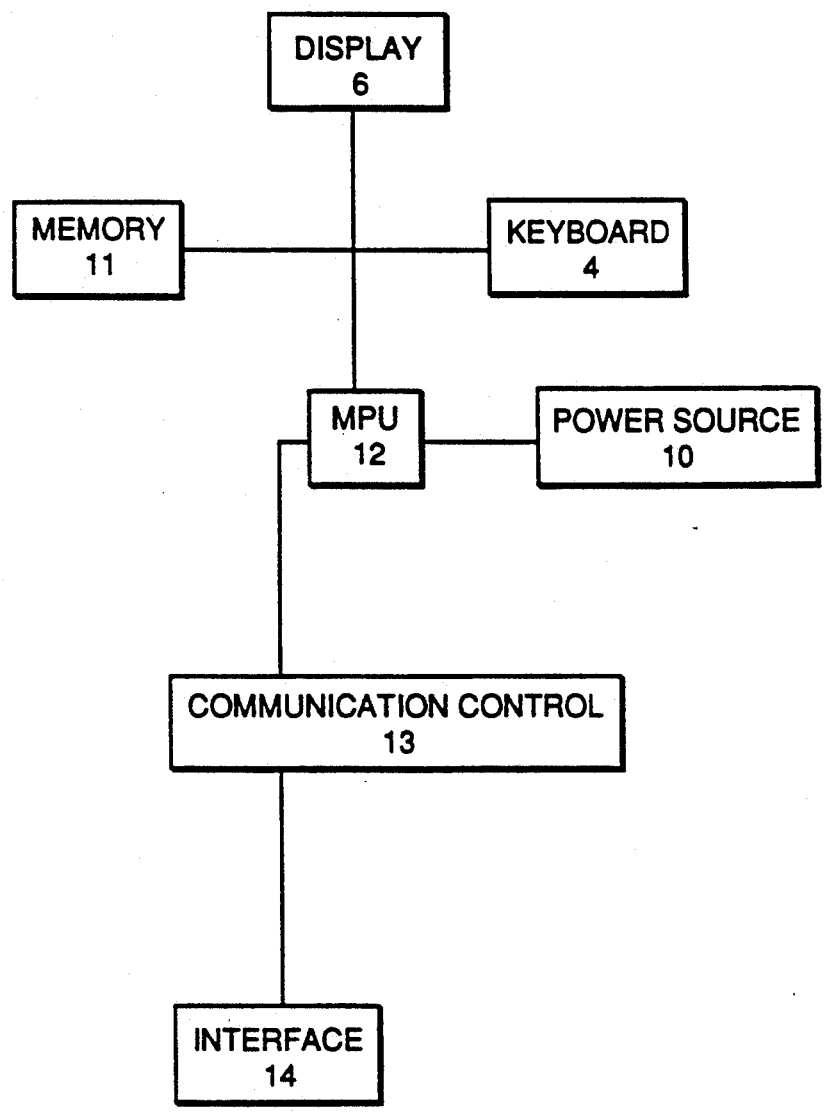
FIG. 2 is a block diagram of a main circuit according to the present invention and FIG. 3 is a functional block diagram in the embodiment of the present invention.

Referring to FIG. 1 showing one embodiment of a trap selector according to the present invention, a trap selector 1 has a housing 2 into which various circuits are built, as well as a control panel 3 provided on the surface thereof. On the control panel 3 are arranged a keyboard 4 and a display 6. The various circuits built into the housing 2, as shown in FIG. 2, consist of a power source 10, a memory 11, an MPU 12, a communication control part 13, an interface 14 and the keyboard 4 and the display 6 connected thereto. In the memory 11, a selection logic for selecting an optimum steam trap, and various engineering expressions associated with the selection logic are memorized, and, in addition thereto, geometrical conditions concerning the diameter of an orifice, the figure of a passage, etc. in a variety of steam traps are also memorized. The geometrical conditions: $C_v$ may be represented by the following expression, $$C_v = W/w_1$$

where W indicates the measured value of the discharging flow rate of a trap, and $w_1$ is represented by the flow rate in the case of $C_v = 1$. This $w_1$ can be obtained by a relational expression mentioned below.

Figure 3A:
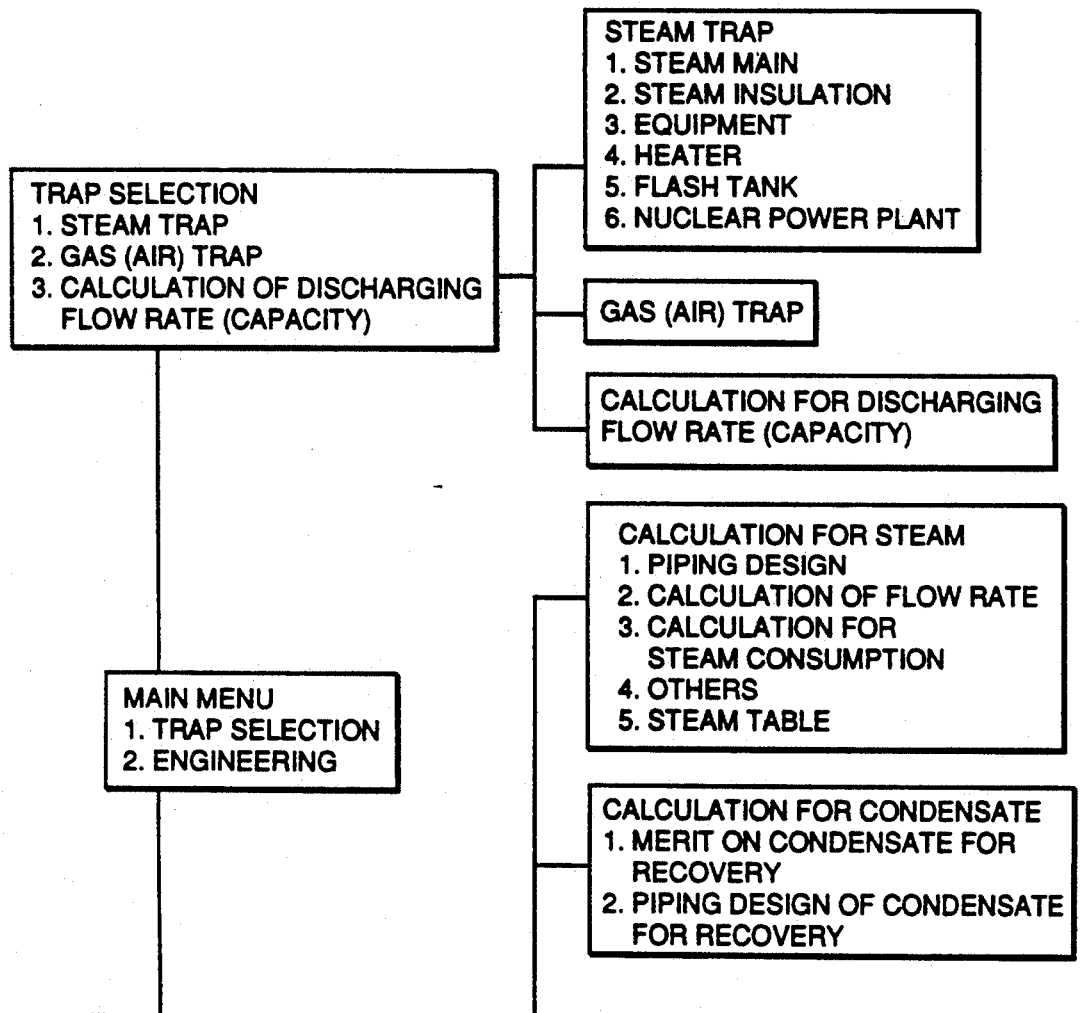
Figure 3B:
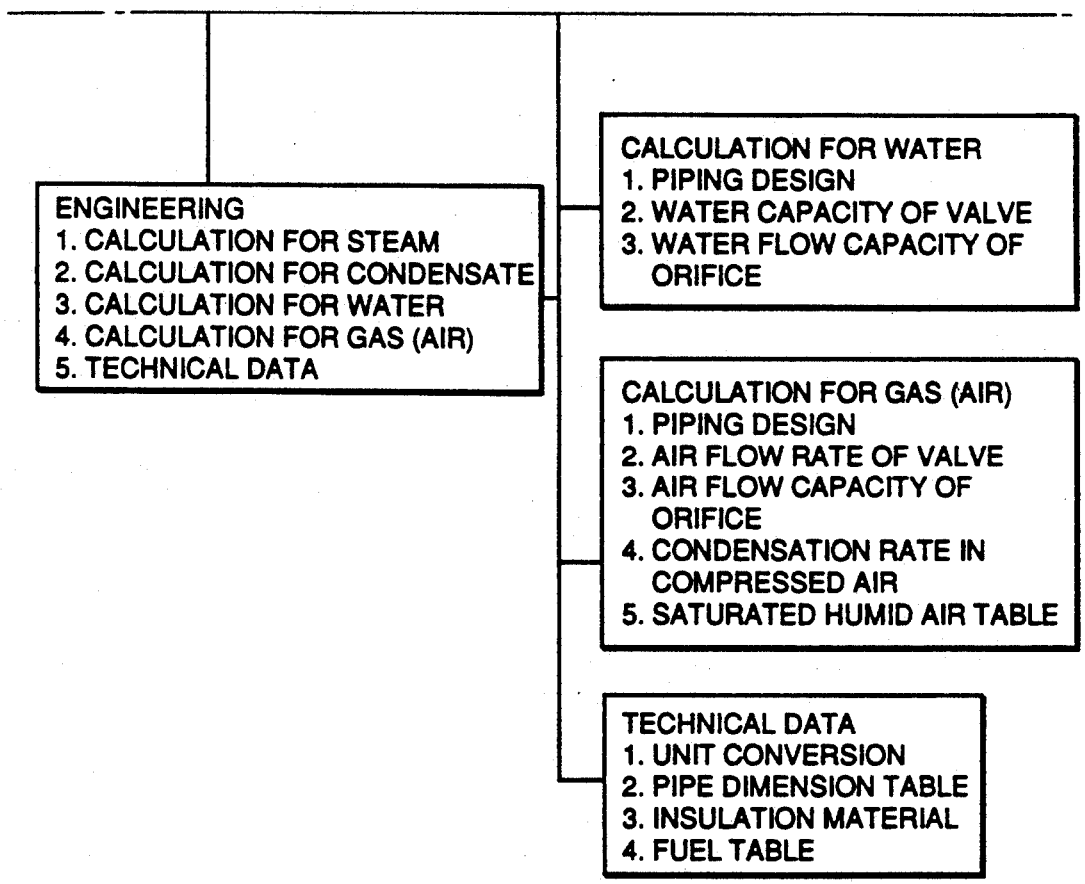

The contents of the selection logic and the various engineering expressions, which are indicated in FIG. 3 (FIG. 3 is now FIGS. 3A and 3B), are sequentially indicated on the display and an optimum trap can be selected while various kinds of engineering calculations are executed if required. This operation will be explained in detail hereinafter.

For instance, when the optimum steam trap employed for a steam main pipe is selected, "1. trap selection" should be designated from [Main Menu] indicated on the left side of FIG. 3. When the [Main Menu] is selected, the indication on the display 6 is changed to [Trap Selection] indicated in the central and upper part of FIG. 3, so that "1. steam trap" should be designated therefrom. When the [Trap Selection] is selected, the indication is changed to [Steam Trap] shown in the upper part of the right side of FIG. 3, "1. steam main" should be similarly designated. In this step, the thermodynamical conditions such as the primary steam pressure, the secondary steam pressure and the fluid temperature of the steam trap are inputted and the discharging flow rate for the respective working conditions of the steam trap is obtained from the product of the thermodynamical conditions and the geometrical conditions of the steam trap. This will be explained by using the following expression in accordance with the standard of Instrument Society of America, $$F_s = C_v \times f(P_1, P_2, \Delta t)$$

where $F_s$ indicates discharging flow rate under a certain condition of a steam trap, $C_v$ indicates the geometrical conditions of the trap, $P_1$ indicates the primary steam pressure of the trap, $P_2$ indicates the secondary steam pressure of the trap and $\Delta t$ indicates the difference between fluid temperature and saturation temperature. The above mentioned $f(P_1, P_2, \Delta t)$ is represented by the following expression.

$$f(P_1, P_2, \Delta t) = 856 F_L ((P_1 - F_F P_V) G_S)^{\frac{1}{2}}$$

where $$F_L = ((P_1 - P_2)/(P_1 - P_{VC}))^{\frac{1}{2}}$$

$$F_F = 0.96 - 0.28 (P_V/P_C)^{\frac{1}{2}}$$

$P_V$ indicates saturation pressure corresponding to the temperature of condensate on the primary side of the trap.

$P_{VC}$ indicates the minimum value of pressure in contraction flow immediately behind the orifice.

$G_S$ indicates specific weight of condensate.

After the above mentioned procedure, other data required for the selection of the optimum trap including condensation rate or the safety factor of a trap is inputted and the discharging flow rate of the steam trap is compared with the actual condensation rate, the optimum steam trap thereby being determined. The safety factor may be previously programmed and possibly replaced by another one. Further, trap type, trap body material, trap size, trap model and trap material may be selected from among a group of steam traps roughly sorted as a result of the input described above so as to select the optimum steam trap.

The relation between other functions and input items in the trap selection shown in FIG. 3 will be designated as follows.

| function | | input items |
|---|---|---|
| steam trap | steam insulation | steam pressure, steam temperature, trap back pressure, condensation rate, ambient temperature, etc. |
| | steam equipment | max. working steam pressure, steam temperature, trap back pressure, condensation rate, etc. |
| | heater | steam pressure, trap back pressure, estimated condensation rate |
| | flash tank | condition of condensate for recovery, set pressure for flash tank |
| | nuclear power plant | max. working steam pressure, steam temperature, trap back pressure, condensation rate, etc. |
| gas (air) trap | | inlet pressure, back pressure, temperature of water |
| engineering of discharging liquid flow rate | | inlet pressure, back pressure, degree of subcooling condensate, etc. |

In case the actual condensation rate is not obvious, "3. calculation for steam consumption" should be specified from [Calculation for Steam] indicated in the central part of the right side of FIG. 3 and it should be obtained according to the procedure mentioned below.

In order to calculate the condensation rate produced in a steam main pipe when heat insulation is not made, data to be inputted will be listed below.

pipe size: A[mm]
schedule number: Sch
pipe material: STPG, SGP, etc.
length of pipe: L [m]
steam pressure: P [kg/cm² G]
ambient temperature: $T_o$ [° C.]

Data memorized in the memory of the trap selector is described in the following.

weight per unit length for size of each pipe schedule number and each material
specific heat for each pipe material
corresponding relation of tables for saturated steam and for superheated steam From the inputted data and the memorized data, the following data is calculated.

Initially, from the relation illustrated in the table for steam by steam pressure P, the following data can be obtained.

1. steam temperature: $T_s$ [° C.]
2. latent heat of steam: r [Kcal/kg]

Furthermore, from the diameter of pipe size A, schedule number Sch and pipe material, can be obtained the following data.

3. weight per unit length of pipe: $G_u$ [Kg/m]
4. specific heat of pipe: C

From the above mentioned data, the condensation rate Q [kg] can be calculated from the following expression.

$$Q = C \times L \times G_u (T_s - T_o)/r$$

As shown in FIG. 3, other engineering calculations associated with the trap selection, for instance, calculation on merit of condensate for recovery or steam piping design and the like can be properly selected and thus executed by the use of a well-known relational expression.

As apparent from the above description, according to the present invention, since the geometrical conditions of the trap are previously memorized, the thermodynamical conditions such as pressure, temperature, etc. are subsequently inputted and the discharging flow rate, in other words, the discharging flow capacity of the trap, is calculated. An optimum trap can be selected by the use of a memory with small capacity without memorizing the discharging flow capacity for various working conditions of various traps. This is an excellent effect that cannot be attained by the conventional technique.

What is claimed is:

1. A steam system trap selector comprising:
    a keyboard having keys for inputting numeric figures and function commands of a selection process;
    a display for indicating input and output numerical values and said function commands of the processes;
    a memory unit for storing trap-proper geometric parameters of respective traps, thermodynamic parameters of steam systems, calculation processes executed with said parameters, and sequence programs for conducting said calculation processes in accordance with predetermined sequences; and
    a microprocessor unit for conducting the calculation processes in accordance with the sequence programs, and for determining from inputted thermodynamics parameters and stored trap-proper geometric parameters a flow rate of condensate;
    said microprocessor unit comparing the flow rate of condensate with a condensation rate in the steam system so as to determine one or more traps having a flow rate of condensate more than the condensation rate.

2. A trap selector according to claim 1, wherein further system-proper parameters relating to the construction and shape of the steam system are stored in the memory unit to be used in execution of the calculations relating to the steam system.

3. A trap selector according to claims 1 or 2, wherein said display sets forth a menu of items and each calculation process in said sequence is successively executed by specifying either the item number of the menu displayed on the display or the numerical value of the required parameter by means of the corresponding numeric keys.

4. A trap selector according to claim 3, wherein in the case of an unknown value of a parameter to be input in the sequence of the calculation process for selecting the trap, the calculation of the technical data can be called on to determine the unknown value, thereby enabling the following processes to be conducted.

5. A trap selector according to claims 1 or 2, wherein the steam flow rate of the trap can be expressed by the product of two factors: the first depending only on the thermodynamic parameters; and the second being a valve flow coefficient $C_v$ which depends only on the trap-proper parameters.

6. A trap selector according to claim 5, wherein a measured value is used as the valve flow coefficient $C_v$.

7. A trap selector according to claim 5, wherein the valve flow coefficient $C_v$ is determined by using the measured steam flow rate of the trap.

8. A trap selector according to claims 1 or 2, wherein an empirical or experimental value is used as the value of the condensation rate.

9. A trap selector according to claims 1 or 2, wherein the value of the condensation rate is determined from both a measured amount of condensation and a measured equilibrium time for an initial transient period.

10. A trap selector according to claims 1 or 2, wherein the trap selector further includes an interface and a communication control unit.

* * * * *